Oct. 17, 1967 J. BRAYMAN ET AL 3,346,922
PRESS STRUCTURES
Original Filed March 31, 1964 6 Sheets-Sheet 1

INVENTORS
ALEXANDER ZEITLIN,
JACOB BRAYMAN &
BY MARK B. KOMORN their ATTORNEYS

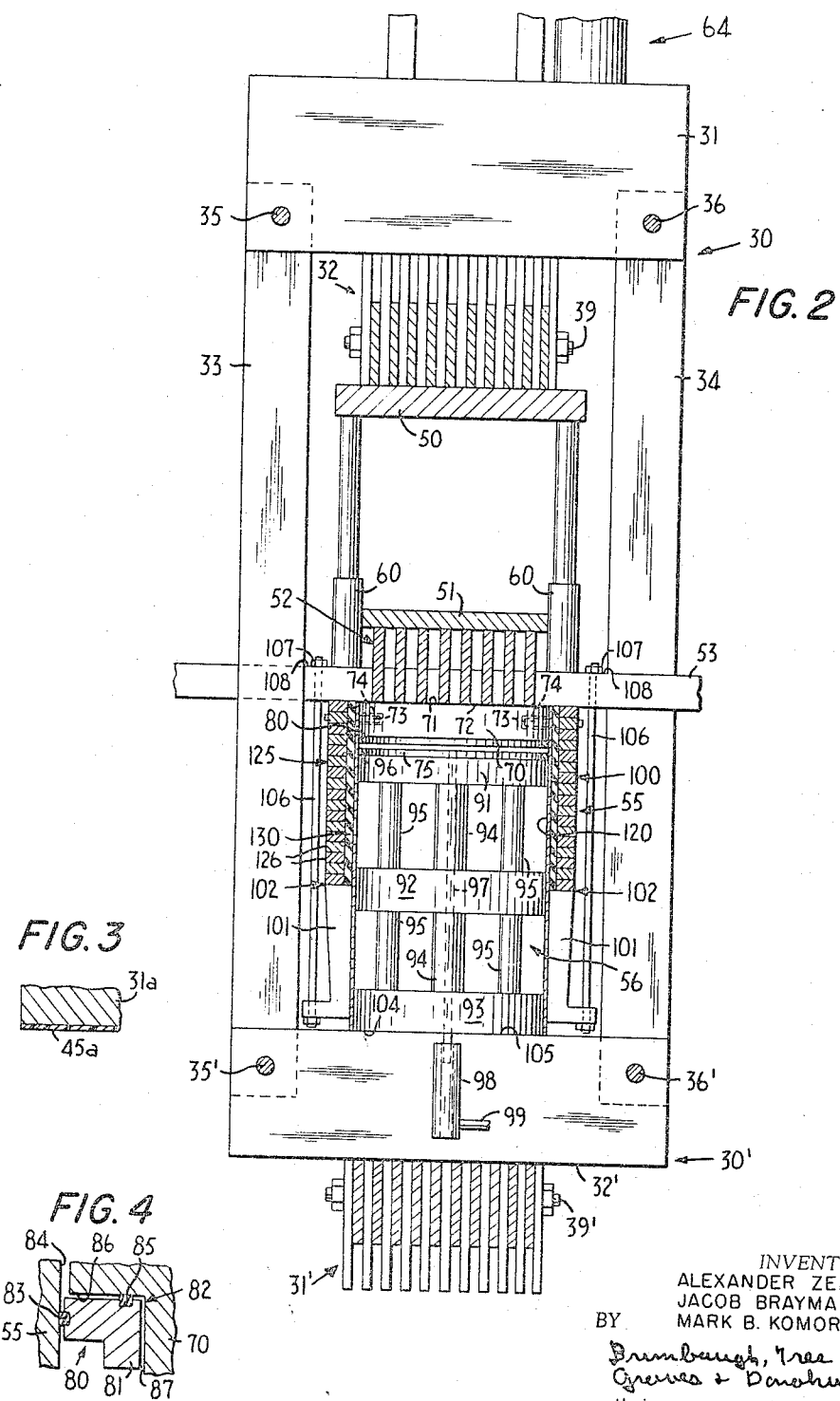

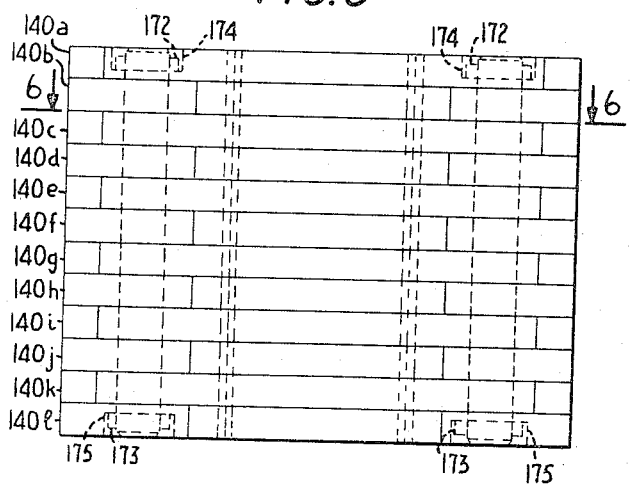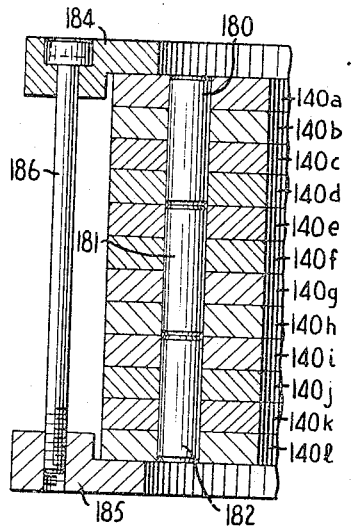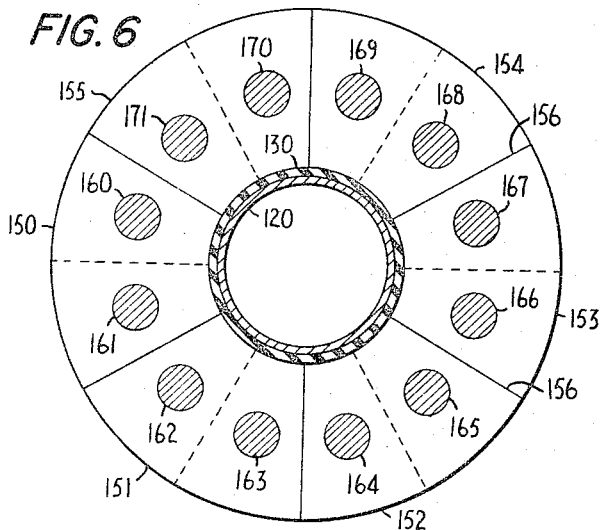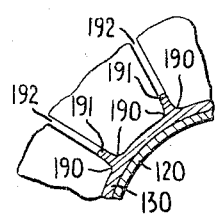

Oct. 17, 1967

J. BRAYMAN ETAL 3,346,922

PRESS STRUCTURES

Original Filed March 31, 1964

INVENTORS
ALEXANDER ZEITLIN,
JACOB BRAYMAN &
BY MARK B. KOMORN their ATTORNEYS

Oct. 17, 1967  J. BRAYMAN ETAL  3,346,922
PRESS STRUCTURES
Original Filed March 31, 1964  6 Sheets-Sheet 5

INVENTORS
ALEXANDER ZEITLIN,
JACOB BRAYMAN &
BY  MARK B. KOMORN
their Attorneys

Oct. 17, 1967  J. BRAYMAN ETAL  3,346,922
PRESS STRUCTURES
Original Filed March 31, 1964  6 Sheets-Sheet 6
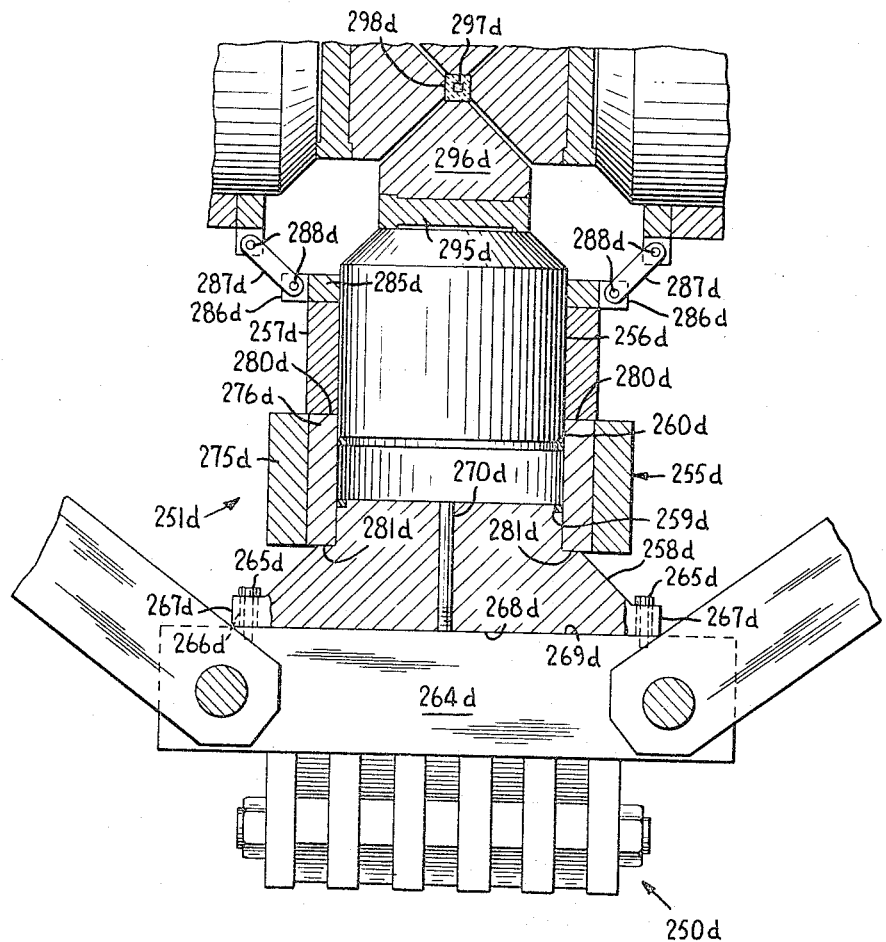
INVENTORS
ALEXANDER ZEITLIN,
JACOB BRAYMAN &
BY  MARK B. KOMORN
their  ATTORNEYS United States Patent Office 3,346,922
Patented Oct. 17, 1967

3,346,922
PRESS STRUCTURES
Jacob Brayman, White Plains, Mark B. Komorn, Jackson Heights, and Alexander Zeitlin, White Plains, N.Y., assignors to Barogenics, Inc., New York, N.Y., a corporation of New York
Original application Mar. 31, 1964, Ser. No. 356,171, now Patent No. 3,278,993, dated Oct. 18, 1966. Divided and this application June 13, 1966, Ser. No. 571,352
20 Claims. (Cl. 18—16)

ABSTRACT OF THE DISCLOSURE

A structural frame especially useful for presses comprising a plurality of spaced load-opposing compound heads each comprised of a plurality of crossheads in juxtaposed criss-cross relation. The heads are interconnected by a plurality of tie couplings of which each is connected to two crossheads disposed at opposite ends of the coupling and belonging to different compound heads. The couplings connect the compound heads together by one of the component crossheads of each to form a closed frame comprised of a plurality of closed rings.

---

This application is a division of application Ser. No. 356,171, filed Mar. 31, 1964, now Patent No. 3,278,993, of which the invention relates to hydraulic presses and other apparatus operably characterized by loads of high tonnage value or by high pressures or by both. More particularly, this invention relates to structural improvements in apparatus of such sort.

An example of a large tonnage load is 10,000 tons per head for a multiaxial press and 30,000 tons per active head for a uniaxial press. An example of a high hydraulic pressure is 400,000 p.s.i. The invention, is, of course, applicable to apparatus involving loads or pressures above or below the mentioned exemplary values. Moreover, the invention is applicable to apparatus other than presses.

The invention relates to an improved frame for apparatus developing active and reactive loads. Such frame includes a plurality of loading-opposing (i.e., load-bearing) compound heads each comprised of a plurality of crossheads in juxtaposed criss-cross relation. Also included in the frame are a plurality of tie couplings by which each compound head is connected by ones of its component cross-heads to one or more other compound heads of the frame. By so employing heads which are compound and are connected together by more than one crosshead of each, the strength of a frame of given size may be substantially increased as compared to that of a conventional frame.

For a better understanding of how the invention is realized, reference is made to the following description of exemplary embodiments thereof, and to the accompanying drawings wherein:

FIG. 2 is an elevation in cross section of a portion of the FIG. 1 press, the view being generally taken as indicated by the arrows 2—2 in FIG. 1, the upper inside crosshead and lower outside crosshead of the press being rotated to have their longitudinal axes normal to the plane of the drawing;

FIG. 3 is a fragmentary elevation view in cross section of a detail of the FIG. 1 press;

FIG. 4 is a fragmentary elevation view in cross section of another detail of the FIG. 1 press;

FIG. 5 is a front elevation of a structure suitable for the hydraulic cylinder of the FIG. 1 press;

FIG. 6 is a plan view in cross section of the structure of FIG. 5, the view being taken as indicated by the arrows 6—6 in FIG. 5;

FIG. 7 is a broken-away view in radial cross section of one side of a structure which is a modified form of the structure of FIG. 5;

FIG. 8 is a broken-away plan view of a modification of the structure of FIG. 5 or the structure of FIG. 7;

FIG. 9 is a broken-away plan view of another modification of the structure of FIG. 5 or the structure of FIG. 7;

FIG. 15B is an enlarged view of a portion of FIG. 15A.

Figure 1:
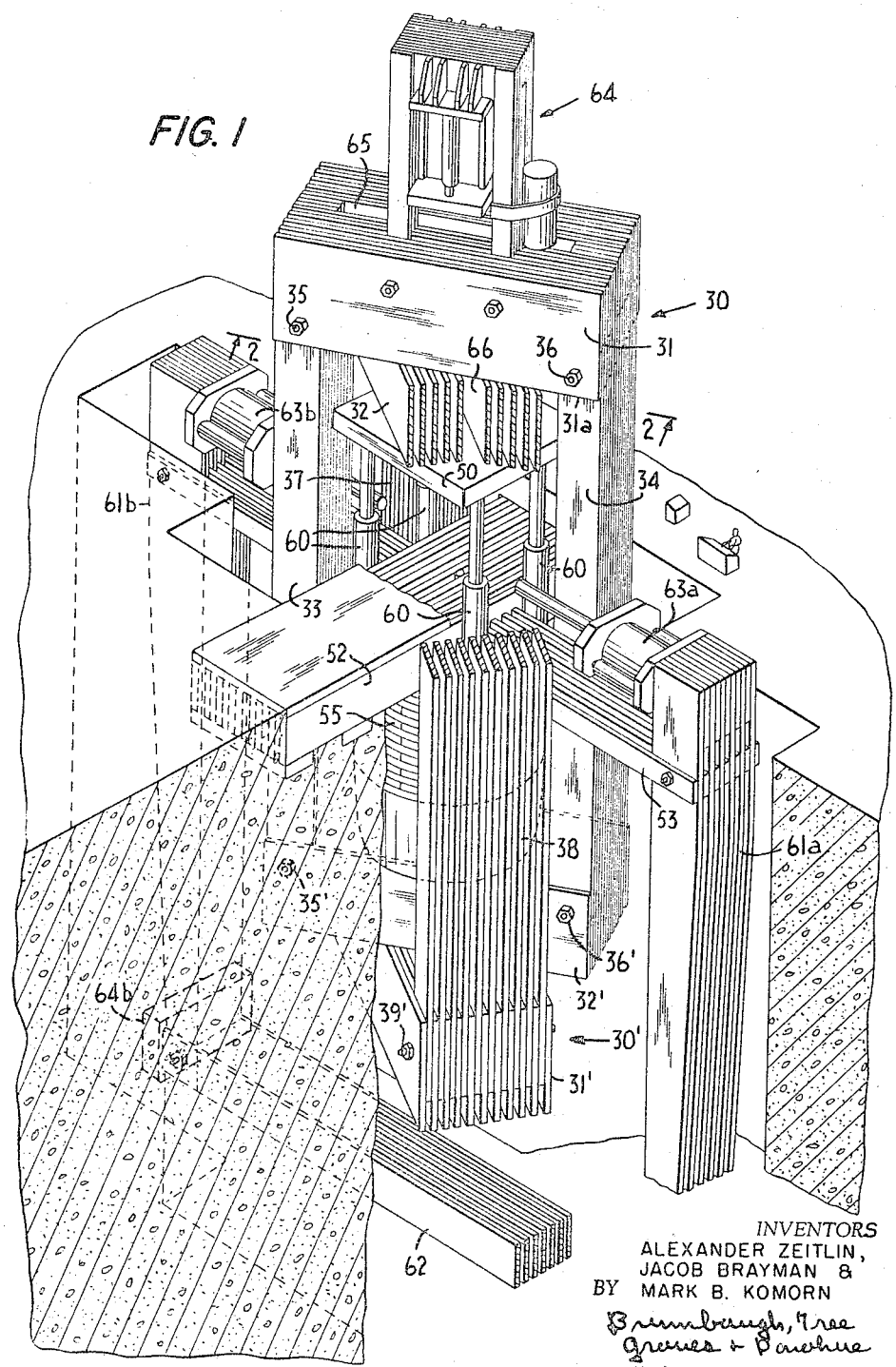
FIG. 1 is an isometric view of a 120,000 ton uniaxial pull-down press in accordance with the invention.

In the description which follows, counterpart elements are designated by the same reference numeral but are distinguished from each other by different suffixes for that numeral. It is to be understood that, unless the context otherwise requires, a description of one element is to be taken as equally applicable to all counterparts thereof.

FIG. 1 shows a pull-down hydraulic press adapted to exert a force as large as 120,000 tons on an object to be pressed. The press has an upper compound head 30 comprised of an outside crosshead 31 and an inside crosshead 32, the two crossheads being in juxtaposed, diagonally criss-cross relation. While compound heads formed of two crossheads are shown in U.S. Patent 2,722,174 to Albers, the head 30 differs from the Albers heads in the respects among others that the crossheads 31 and 32 are in diagonal relation and are of about equal longitudinal span.

The crosshead 31 is comprised of an array of horizontal beam plates having interleavings at opposite ends of the array with left-hand and right-hand sets 33 and 34 of vertical tie bars. Left-hand and right-hand shear pins 35 and 36 pass through those interleavings to pivotally connect the crosshead 31 to its tie couplings 33 and 34.

In like manner, the inside crosshead 32 of upper head 30 is comprised of an array of horizontal beam plates interleaved at opposite ends with sets 37, 38 of vertical tie bars, the crosshead 32 being pivotally connected to those tie couplings 37 and 38 by two shear pins of which only the front pin 39 is shown (FIG. 2).

The four tie couplings 33, 34, 37, 38 connect the upper compound head 30 to a lower compound head 30' comprised of an outside crosshead 31' and an inside crosshead 32' of the same respective constructions as the crossheads of the upper head 30. The tie couplings 33 and 34 are pivotally connected at their bottoms to opposite ends of the inside crosshead 32' by a pair of shear pins 35', 36', passing through interleavings of the beam plates of the crosshead with the tie bars of the couplings. Also, the tie couplings 37 and 38 are pivotally connected at their bottoms to opposite ends of the outside crosshead 31' by a pair of shear pins (of which only pin 39' is shown) passing through interleavings of the tie bars of the last named couplings with the beam plates of the last named crosshead. Hence, the frame of the FIG. 1 press which bears the pressure load is comprised of two closed, articulated nonrigid rings constituted of separate groups of tie couplings and crossheads, one ring being comprised of the elements 31, 34, 32', 33, and the other ring being comprised of the elements 32, 37, 31', 38.

As shown, the crossheads of each compound head are in juxtaposed, diagonally criss-cross relation to render that head in the shape of an X characterized by acute and obtuse angles between the arm of the X. The diagonal criss-crossing of the crossheads provides wider access from the front and back of the press to the central pressing area than would an orthogonal criss-cross.

In operation, each inside crosshead deflects to transmit part of the load thereon to the juxtaposed outside crosshead. Otherwise, the two crossheads of each compound head are uncoupled for load and are free to adjust in relative position in each of the directions of criss-cross of those crossheads. To facilitate such positional adjustment, the outside surface of each inside crosshead which bears against the juxtaposed inside surface of each outside crosshead is coated with a layer of a synthetic resin (e.g., "Teflon") serving as a solid lubricant. A coating 45a of this sort is shown (FIG. 3) for the bearing surface of the beam 31a of the upper outside crosshead 31.

Disposed beneath the upper inside crosshead 32 is the upper main platen 50 of the press. Directly beneath the upper platen is the lower main platen 51 (FIG. 2) resting on a massive horizontal beam 52 formed of an array of beam plates and supported at opposite ends by the side walls of the foundation well of the press. The plates of beam 52 have slots underneath to permit passage through the beam and normal to it of an array of beam plates forming a second horizontal beam 53. The slots may be shaped in the form of I notches in which case the lower beam 53 (the function of which will be described later) may be coupled to the upper beam 52 by this I configuration of the notches in the upper beam and the mating I configuration in cross section of the lower beam plates received in those notches. The beam 53 is adjustable in position in the direction of its axis relative to beam 52. As is evident, the beams 52 and 53 pass at right angles to each other between the four vertical tie couplings 34, 35, 37, 38 and through the center of the X disposition in the horizontal plane of those tie couplings.

Directly beneath beam 52 is a hydraulic cylinder 55 in the lower end of which there is received a downward acting ram 56. That single cylinder is enabled by its construction (later described in detail) to replace the perhaps 20 hydraulic cylinders which would have been required by the practice of the prior art to provide a pressing force of 120,000 tons.

The ram 56 bears against the lower inside crosshead 32' to pull down (during a pressing operation) the entire pressure-bearing frame comprised of the compound heads 30, 30', the vertical tie couplings and the described shear pins. The pulling down of the frame advances upper platen 50 to first engage with and then press a workpiece (not shown) positioned between the upper and lower platens. The resulting downward pressure loading from the lower platen 51 on beam 52 is counter-balanced by the upward pressure loading on the beam from cylinder 55. Thus, the beam 52 is not subjected to any net pressure loading transmitted to its support.

After completion of a compressing operation, the pressure-bearing frame is returned to starting position by four hydraulic jacks 60 supported by beam 53 and positioned to lift from underneath the upper platen 50. When the press is not in operation, the jacks 60 support the weight of the pressure-bearing frame. Since the jacks are supported by beam 52 which is supported by the foundation for the press, it will be seen that the weight of the press is transmitted by beam 52 to the foundation. When the press is in action, the weight of the movable portion is transmitted to beam 52 through the upper platen, workpiece and lower platen.

The beam 53 supports at opposite ends a pair of vertical tie bar columns 61a and 61b pivotally linked at their lower ends by shear pins to a fabricated coupling beam 62. The upper ends of the columns 61 are pivotally connected by shear pins to beam 53, and, further, project above beam 53 to provide respective backings for a pair of 10,000 ton horizontal piercing presses 63a and 63b. A third 10,000 ton vertical piercing press 64 is mounted on the upper compound head 30 and is adapted to act downwardly through central openings 65 and 66 in the outside and inside crossheads of the head 30.

When presses 63a and 63b are both actuated, the parallogram linkage 53, 61a, 62, 61b equalizes the respective loads exerted by the two presses on the workpiece therebetween. The same equalizing of loads occurs when just one press is actuated and the other is in contact with the workpiece but acts merely as a passive stop, a dummy block being mounted on the passive press to prevent piercing thereby of the workpiece. Hence, the presses 63a, 63b may be operated either one at a time or together without having to provide additional stops to absorb the reactive load in the instance when one press is active and the other press is passive. If desired, however, abutments 64a, 64b (of which only 64b is shown) may be utilized at opposite ends of beam 62 to limit the distortion from rectangular shape of parallogram linkage 53, 61a, 62, 61b.

Besides the already mentioned advantages of the FIG. 1 press, the press and its frame have numerous other advantages of which some are as follows.

In prior art frames for presses and the like it was usual for both the crossheads and the tie couplings to be single piece structures (exceptions being the frames disclosed in U.S. Patent 2,416,058 to Mangnall and U.S. Patent 2,722,174 to Albers). For large tonnage presses, however, those single piece structures would have to be so large as to be incapable of being manufactured, transported, or handled by present manufacturing and weight-handling equipment. The FIG. 1 press overcomes these problems by utilizing crossheads, couplings and other structural members individually constructed of a number of structural elements of which can be manufactured, transported and assembled in place without difficulty.

As described in U.S. Patent 2,968,837, the pivotal connections of the heads of the press through shear pins is a feature which (a) eliminates deflections due to transmission of bending moments through the connections, (b) provides a highly efficient mode of connection (the cross section of each pin holds in multiple shear to thereby provide many times the holding strength of a tension-stressed tie coupling of equal holding cross section), (c) eliminates the extra span required of a head in order to connect it by tie rods, (d) renders the frame non-rigid and responsive to loading to be self-truing in alignment.

The described compound heads (comprised of juxtaposed criss-crossed individually coupled crossheads) are advantageous for the reason that a simple head or a compound having only one coupled crosshead is (even if the head is comprised of multiple beam plates) incapable of withstanding the pressure load imposed by presses of very large tonnage as, say, 120,000 tons for a uniaxial press. In the present press, the effective spans of all crossheads are identical. This design results in both frame structures stretching and deflecting in an identical manner. Therefore, the load is distributed equally between the two structures. Should peculiar conditions of an installation require the two frame structures to be of different configurations, then the two frames can be still so designed as to have correspondingly equal deflections.

By using compound heads of which the component crossheads of each are individually coupled into the frame, the size of the bed for the press can be considerably reduced as compared to what has heretofore been required for a press of the same tonnage. The ability of the criss-cross crossheads of each frame to adjust relative to each other in each of the directions of criss-cross permits the frame to be non-rigid and self-truing in both those directions.

Despite the freedom of relative transverse movement of the two crossheads of each head, the loads on the two crossheads are substantially equalized because the inner crosshead responds to the total load to deflect axially to bear against the outer crosshead until about half the total load is transmitted from the inner crosshead to the outer crosshead to be borne by the latter.

The connection of each tie coupling at one and the other of its ends to, respectively, an inside crosshead and an outside crosshead is desirable because, by so doing, all the tie couplings can be identical. By using identical couplings, manufacturing costs are reduced, and all the couplings can be made from the longest length tie bars which are manufacturable. Another advantage in having all the tie couplings identical (so as to be identical in the spacing characterizing each coupling between the shear pins which pass through the coupling) is that each coupling stretches equally under a given tensile load to provide another factor tending to equalize the respective loads borne by the inside and outside crossheads of each compound head.

Some exemplary dimensions for the FIG. 1 press are 116 feet from the top of head 30 to the bottom of head 30', 28 feet between the inside edges of each pair of tie couplings connected to the same crossheads, 18 feet for the inner diameter of cylinder 55 and 12 feet for the stroke of ram 56.

Referring now to the details shown in FIG. 2, the cylinder 55 has an open top in which is received a passive closure plug 70 disposed directly above the expandable chamber 75 in cylinder 55 for the pressurized hydraulic fluid introduced into the cylinder. The plug 70 has an upper planar bearing surface 71 mating with the planar bottom surfaces 72 of the beam plates in the beam 52 and 53. All of surfaces 72 lie in the same plane normal to the cylinder axis. The bearing surfaces 71 and 72 are preferably coated (as in FIG. 3) with a layer of "Teflon" or other synthetic resinous material adapted to serve as a solid lubricant.

The plug 70 is supported from cylinder 55 by equi-angularly-spaced radial pins 73 passing horizontally through the cylinder into holes 74 in the side of the plug. The holes 74 are of greater diameter than the pins received therein so as to provide axial play between the plug 70 and the cylinder 55. Consequently, the axial pressure loading of plug 70 by the fluid in chamber 75 is not transmitted to the cylinder 55. Moreover, the pins 73 allow the cylinder 55 to radially expand and contract unconstrained by the plug, wherefore the radial loading of the cylinder by fluid pressure is not transmitted to the plug. Since the plug and cylinder are thus fluid pressure loaded independently of each other, there is no communication of load stresses between those elements. Therefore, there is avoidance in the FIG. 2 hydraulic container of the stress concentration which occurs at the juncture of a hydraulic cylinder and an end closure in the instance where the closure is an end wall integral with the cylinder.

The clearance between plug 70 and cylinder 55 is rendered substantially fluid tight by a seal assembly 80 of the type disclosed in copending U.S. Patent application Ser. No. 127,738, filed July 28, 1961, now Patent No. 3,136,475 and owned by the assignee hereof. As shown in FIG. 4, the assembly 80 comprises an annular resiliently expandable metal ring 81 seat in an annular "upside-down L" groove 82 extending circumferentially around plug 70 at the front thereof. Ring 81 carries at its outer diameter an O ring seal 83 in contact with the inner wall 84 of the cylinder 55. On its upper face, the ring 81 carries a second O ring seal 85 disposed radially inwards of and above seal ring 83 to be in contact with the horizontal planar face 86 of the groove 82.

In operation, some of the pressurized fluid below ring 81 is forced by the pressure into the vertical interface 87 between plug 70 and carrier ring 81 to there exert radial outward pressure on the ring 81. In response to such pressure, the ring 81 tends to expand radially more than the inner wall 84 of cylinder 55 expands radially in response to the fluid pressure on the cylinder. Hence, the carrier ring 81 is always hugging the wall 84 of cylinder 55. Thus, the seal 83 squeezed by the fluid pressure has never an opportunity to extrude itself into any clearance between 84 and 87 because such clearance never exists. Simultaneously, the press of the fluid below ring 81 exerts on that ring an upward axial pressure which is not balanced by any fluid pressure force in the interface disposed outward of seal ring 85 between the ring 81 and the face 86. Thus, there is exerted on carrier ring 81 a net upward force which forces this ring against corresponding surface 86 of groove 82. Thus, the seal 85 is never given an opportunity to extrude in any clearance between 81 and 86 because such clearance does not exist. This design results in rings 83 and 85 having a self-tightening character under pressure while being safe from extrusion. Their combination prevents fluid from getting by either between 86 and 81 or between 70 and 81.

The ring 81 has under no-pressure conditions a substantial clearance 87 with plug 70, and, when the carrier ring 81 expands under pressure, the clearance 87 opens up. Hence, if there is any static (no-pressure) or operable eccentricity between the plug and the inner cylinder wall 84, the seal assembly is able to assume a position eccentric in relation to the plug but concentric in relation to the cylinder wall so as to provide a continuous fluid-sealing pressure contact at uniform pressure around the entire cylinder wall 84 between that wall and seal ring 83. Therefore, the described sealing assembly provides a tight radial seal irrespective of eccentricity between the plug 70 and the inner cylinder wall 84. Any eccentricity between the seal assembly and the plug does not interfere with the sealing action of axial seal ring 85 because the plug surface 86 against which seal carrier 81 is pressed is a planar surface normal to the plug axis.

The ram 56 of the FIG. 2 hydraulic container is comprised of three massive, axially spaced plates 91, 92, 93 connected by a vertical central column 94 and a plurality of outer vertical columns 95 equiangularly spaced around the central column. The clearance between the ram 56 and pressure-containing portion of cylinder 55 is sealed against entry of fluid by a self-tightening fluid seal assembly 96 similar in construction and operation to the previously described assembly 80. Hydraulic fluid is introduced into the chamber 75 by a conduit 97 passing downwardly through ram column 94 to make a telescopic fluid-tight connection with a supply pipe 98 connected by an inlet 99 and flexible tubing (not shown) to pumps or another source of pressurized hydraulic fluid at, say, 8,000 p.s.i.

In a conventional hydraulic ram unit, the hydraulic cylinder is an axially continuous "long" structure extended forward of the portion which contains the fluid pressure to provide a front portion whose sole function is to guide the ram. Thus, the cylindrical wall of the conventional hydraulic cylinder is subjected both to the stresses caused by the fluid pressure and to the stresses caused by any forces tending to misalign the ram.

The FIG. 2 hydraulic cylinder differs in that the portions thereof which contain the pressure and which guide the ram are axially discontinuous. Specifically, the FIG. 2 cylinder is divided by a discontinuity 102 into an upper pressure container 100 and a lower cylindrical guide 101. The discontinuity 102 is a planar discontinuity normal to the cylinder axis so as to be non-transmissive of shear force normal to such axis. If desired, the surfaces which bear at discontinuity 102 can be lubricated by coating on these surfaces of solid lubricant "Teflon."

In operation, the container 100 is radially expanded by fluid pressure to open its clearance with the ram. Moreover, while container 100 is maintained substantially axially parallel with the ram by resting on guide 101, the discontinuity 102 permits the container shift in horizontal position (in either horizontal direction) relative to guide 101 in response to any sidewise displacement of or tilting of the ram (relative to the guide axis) which brings the ram into contact with the inner wall of the container. Hence, the container 100 has substantially no guiding effect on the ram, but, by the same token, is substantially uncoupled from forces tending to misalign the ram.

The guide 101, on the other hand, is not radially expanded by the fluid pressure and accordingly, maintains a substantially fixed clearance with the ram plates 92 and 93 to provide accurate guidance through those plates for the entire ram 56. While the guide 101 is shown as a solid cylinder, it may, of course, be a fabricated structure, e.g. a cage of vertical guide bars and circumferential rings connecting these bars.

The lower ram plate 93 has a bottom planar bearing surface 104 in contact with upper planar bearing surfaces 105 provided by the beam plates of the lower inside crosshead 32'. The planar bearing surfaces 104, 105 are all normal to the cylinder axis and are coated with a layer of "Teflon" providing a solid lubricant. Apart from the abutting relation of ram 56 with the crosshead 32', the ram is not coupled for load with the crosshead. Hence, the FIG. 2 cylinder is free to adjust in position in both horizontal directions relative to the crosshead 32' by sliding of the ram bearing surface 104 and the crosshead bearing surfaces 105 over each other.

The FIG. 2 cylinder structure is supported by a plurality of equiangularly spaced flexible bolts 106 passing upwardly through a bottom flange of guide 101 and then upwardly through openings in the beam plates of beam 52 and 53 to be threadedly received in nuts 107 above and straddling those last-named openings. The bolts 106 are of small enough diameter to have play in both horizontal directions in the beam openings through which they pass. Further, the undersides of the nuts 107 are coated with solid lubricant "Teflon" and rest upon beam bearing surfaces 108 which are similarly coated. The bolts 106 are, therefore, free to adjust in horizontal position (in either horizontal direction) relative to the load-bearing means provided by beams 52 and 53.

Considering the overall support for and load coupling of the FIG. 2 ram unit, at the upper end of the unit, the discontinuity between the bearing surfaces 71 and 72 transmits the axial fluid pressure load on plug 70 to beam 52, but, at the same time, precludes transmission of any substantial horizontal shearing force between that beam and the ram unit. Similarly, the discontinuity between the ram undersurface 104 and the top surface of crosshead 32' transmits the axial fluid pressure load on the ram to the crosshead 32' but, at the same time, precludes transmission of any substantial amount of horizontal shearing force between the ram and that lower crosshead. Further, the discontinuity between the undersides of nuts 107 and the beam surfaces 108 is substantially non-transmissive of shearing force. Still further, no substantial amount of horizontal shearing force can be transmitted between the cylinder 100 and the beam 52, because the pressure container 100 is not axially loaded by fluid pressure, but, instead, is axially loaded only by the relatively small clamping force exerted by bolts 106. Therefore, the FIG. 2 ram unit is, as a whole, not subjected to any substantial shearing force and resulting shearing stress either from its upper load coupling with structure 52, or from its lower load coupling with crosshead structure 32' (the axial reactive loads on those structures from the ram unit being substantially equal and opposite). Moreover, because the FIG. 2 ram unit is not in horizontally fixed relation with either the beam structure 52, or with the crosshead structure 32', the ram unit is not subjected to any bending moment occasioned by a shift in relative horizontal position (in either horizontal direction) of those two structures. At the same time, the ram unit tends, during operation, to force apart the load bearing structure 52, and the crosshead structure 32'. Such forcing apart serves to produce a self-aligning or "self-truing" of those two structures with each other and also, a self-truing action of each of the frame rings 31, 33, 32', 34 and 32, 37, 31', 38. The mentioned self-truings take place in the manner described in U.S. Patent 2,968,837.

Turning now to a consideration of other differences between the pressure container 100 and conventional hydraulic cylinders, a cylinder of prior art construction is limited in its rating by such construction. That is, a conventional cylinder consists of a single layer forging or a compound cylinder, and the size of the cylinder is limited by the availability of such forgings or compound shells. Generally speaking, the maximum feasible tonnage developed by a conventional single cylinder is somewhere around 6,000 tons. For example, a 54" I.D. conventional cylinder at a pressure of 4,500 p.s.i. can develop at most about 6,500 tons and a 48" I.D. conventional cylinder at 7,000 p.s.i. can develop at most about 6,350 tons, the pressures 4,500 and 7,000 p.s.i. being the top pressure feasible in accordance with prior art practice, in respectively, a 54" I.D. cylinder or a 48" I.D. cylinder of conventional construction.

It follows that a substantial number of conventional hydraulic cylinders are required to provide a hydraulic system of the rating necessary for a large tonnage press. To illustrate, nine and eight such cylinders are, respectively, used in the two 50,000 ton presses now operating in the United States, and eight such cylinders are used in each of the two 35,000 ton presses also now operating in this country.

A substantial disadvantage in the use of multiple cylinders to provide a hydraulic system of the rating needed for a large tonnage press is that such a bank of cylinders needs a bed size substantially greater than that which would be required for a single cylinder of the same rating. Thus, for example, the nine cylinders of the mentioned 50,000 ton press result in a bed size of 15 x 33'. A large bed size is, however disadvantageous (unless required by the purpose for which the press is designed) because it commensurately increases the span required for the load-bearing heads, and, therefore, the massiveness which such heads must have to provide the large span and to compensate for the loss of mechanical strength due to the large span. The result is an extremely heavy press. For instance, the mentioned 50,000 ton press weighs 16,000 tons.

Evidently, therefore, it is desirable for the hydraulic system of a large tonnage uniaxial press to be a single cylinder (or two opposed single cylinders) rather than one or more banks of cylinders. The prior art has, however, been unable to provide single cylinders of the rating needed for large tonnage presses because a cylinder constructed according to prior practice and of the necessary rating would be so large and heavy that it could not be manufactured, transported or handled.

We have overcome the described problem by providing for separation of the two functions performed by a hydraulic cylinder, namely, that of containing without leaks the pressurized hydraulic liquid and that of providing a structure which can contain the extraordinary forces generated by the pressurized liquid acting on the tremendous diameter of the single cylinder of a large tonnage press.

Specifically, to contain without leaks the hydraulic liquid in the pressure container 100 of FIG. 2, we provide a comparatively thin, continuous inner tube 120 preferably produced out of sheet sections appropriately welded together. Depending on the material of the tube, the welding is effected either by conventional means or by the so-called "Electro-slag" Union-melt and similar processes. The only purpose of the tube 120 is to provide a leak-proof container. The tube does not offer a substantial resistance to radial expansion by the radially outward pressure developed by the pressurized hydraulic fluid in space 75. On the contrary, the tube 120 is as resiliently elastic under pressure as other considerations will allow.

To this end, the tube 120 is a "thin-wall" tube in the sense that the thickness of its wall is less than or equal to $\frac{1}{10}$ of the inner diameter of the tube. For such a thin-wall tube, the stress induced by the radially outward pressure of the fluid is considered to be uniform throughout the wall thickness of the tube (McGraw-Hill Encycvlopedia of Science and Technology, Copyright 1960, vol. 10, pp. 584–585).

A part of the stress induced in tube 120 by the fluid pressure acts in the axial direction. To allow such axial stress to drop to zero at the tube ends, the tube 120 is extended well above the seal 80 (the upper limit of the pressure region) and well below the lowest position assumed during operation by the seal 96 (the latter seal determining the lower limit of the pressure region). Moreover, the bottom of tube 120 is free to expand or contract axially so that the tube as a whole is not crimped between two end stops. Therefore, the axial stress set up in the tube has no deleterious effect on its operation.

Rupture of the thin-wall tube 120 by overmuch radial expansion caused by fluid pressure is prevented in the FIG. 2 cylinder by an outer support cylinder 125. If the cylinder 125 were to be a one-piece structure as required by prior art, it would be so large and heavy that it would be incapable of being manufactured, transported or handled. Therefore, the cylinder 125 is a fabricated structure made up of component members which fit together, and which are assembled together at the site of the press. As later described, in some applications, the components into which the whole cylinder 125 is subdivided may be vertical "slices" of the whole cylinder. In FIG. 2, however, the cylinder is shown as being subdivided into a plurality of axially superposed ring layers 126.

The ring layers 126 of FIG. 2 are radially expanded seriatim in the downward direction as the ram 56 moves downwardly to lower the line at seal 96 between the region of support cylinder 125 under fluid pressure and the region of that cylinder not under fluid pressure. Thus, as the fluid pressure line moves downwardly past one ring layer to the layer next below, an edge or "nick" is created at the inner wall of cylinder 125 by the full deflection in radial expansion of the upper ring and by the zero or less than full deflection in radial expansion of the next lower ring. Such nicking effect is, of course, greatest when the fluid pressure line is at the boundary of two contiguous ring layers.

The described "nick" will have a tendency to produce a stress concentration in the outwardly pressing thin-wall tube 120 in the event that such tube 120 is in direct contact with the inner wall of the cylinder 125. To reduce such tendency, a liner 130 of soft material may be interposed in the pressure container 100 between the inner tube 120 and the outer support cylinder. In applications such as that of FIG. 2 wherein the hydraulic pressure is relatively low (e.g. 8,000 p.s.i.), the liner 130 may be comprised of a hydrostatic pressure-transmitting material such as rubber. When, however, the hydraulic pressure is high (e.g. 400,000 p.s.i.), the higher pressure (which is transmitted with substantially full strength through tube 120) would destroy the internal structure of rubber and, therefore, the liner is, in that instance, preferably formed of a soft metal (e.g., lead) which plastically flows under the high pressure but is otherwise not harmed by it.

The liner 130, may, in instances, be omitted as, for example, when the described "nicking" effect is reduced or eliminated or the "nicking" is present but does not produce an undue stress concentration in tube 120 even though the tube is in direct contact with the inner wall of cylinder 125. As another example, the liner 130 evidently can be omitted when the tube 120 and the cylinder 125 are components of a static pressure vessel in which the fluid pressures builds up progressively and is applied simultaneously to all of the ring layers constituting the pressure-container portion of the outer support cylinder.

If desired, each of the ring layers 126 may consist (FIG. 10) of a separate closed solid ring 135 which is circumferentially continuous. That, however, is not our preferred construction because such a continuous ring of the required inner diameter is, to begin with, difficult to manufacture, transport and handle, and because those difficulties are compounded by the fact that the size and weight of the ring are considerably increased by the necessity of making the ring thick enough in radial direction to reduce to an acceptable level the concentration of hoop tension stress produced by the Lamé effect.

By the Lamé effect is meant the concentration of hoop tension stress produced in the cylinder wall at or near the inner diameter of the cylinder when the cylinder is subjected to a radially outward pressure on its inner wall. For a thin-wall cylinder, the Lamé effect is negligible. For a thick wall cylinder, however (i.e., one having an inner diameter less than ten times the cylinder wall thickness), the stress concentration from Lamé effect becomes appreciable enough to be taken into account (McGraw-Hill Encyclopedia of Technology, supra). According to the well-known Lamé formula, the maximum stress occurs at the cylinder's inside surface and is proportional to the pressure times a multiplying factor which decreases with an increase in the value of the ratio of cylinder's outer diameter to that of its inner diameter. The Lamé formula indicates that the stresses drop off rapidly as they proceed from the inner wall outward.

In the ram unit of FIG. 2, the hydraulic pressure is relative low (e.g., 8,000 p.s.i.). Hence, the pressure transmitted through tube 120 and liner 130 to the inner wall of cylinder 125 is not of itself great enough in value to stress the material of rings 135 beyond the maximum safe stress level if, say, such pressure were to stress that material uniformly over the entire cross section. Because, however, of the Lamé effect, such pressure will result in a stressing of the material at the inner wall of rings 135 beyond the safe stress level unless the mentioned multiplying factor is caused to have an appropriately low value by making the outer diameter of each ring 135 appropriately much larger than the inner diameter thereof. For the FIG. 2 ram unit, this would require that the rings 135 (of about 18' inner diameter) have an outer diameter of an order of 28 feet, wherefore each ring would be extremely cumbersome and heavy.

We have discovered that the weight and size of the support cylinder 125 and the difficulty in fabricating it can all be drastically reduced by employing modes of construction for the cylinder wherein it is still containing the hydraulically generated forces but the hoop stresses are not accompanied by any Lamé effect. One structural configuration which realizes that result is shown in FIGS. 5 and 6.

In the structure shown by the last named figures, the ring layers 126 of the support cylinder 125 (FIG. 2) are comprised of a plurality of identical, circumferentially discontinuous rings 140A–140L each comprised of a plurality of identical discrete ring sectors. Thus, for example, the ring 140c is comprised (FIG. 6) of six identical ring sectors 150–155 separated by circumferential discontinuities. The word "discontinuity" refers herein to a structural hiatus formed between elements which may either be abutting or non-abutting. Under no-pressure conditions, the discontinuities 156 are preferably mere interfaces between side-abutting ring sectors, but the discontinuities may alternatively be small size gaps between non-abutting ring sectors. Each of ring sectors 150–155 is of increasing arcuate cross section in the radially outward direction so as to fan out the stress produced at the inner radius of the sector by the fluid pressure transmitted through tube 120 and liner 130. Thus, the stress density in the outer portions of each sector is substantially less than it is at the inner wall thereof.

The thickness of the ring sectors in the axial direction may be decreased as convenient so long as the sectors are not so thin as to buckle under the applied pressure. Thus, the ring sectors for the FIG. 2 cylinder may each be from, say, 4″ to, say, 4′ thick. Also, the number of ring sectors per ring may be increased or decreased from that shown. Hence, the weight of any ring sector may be selected to match the capability of available handling equipment and to meet some other requirements discussed further below.

The ring sectors in the several rings of FIG. 5 are interconnected by tension-resistant couplings so that the sectors are transmissive of hoop forces around the cylinder. Such tension resistant couplings may be provided, for example, by a tongue formed as a part of and projecting from the left-hand side of each sector (outward of the mean radius thereof) and a matching groove formed at the same radial position in the right-hand side of each sector, the sectors in each ring being coupled together by a fitting of the tongue of each sector in the groove of the sector to the left and by a receiving in the groove of each sector of the tongue of the sector to the right. Preferably, however, the tension-resistant couplings are provided by axial shear pins interconnecting the sectors in a manner which may be as follows.

As shown, the FIG. 5 cylinder is vertically divided into odd and even rings of which the sectors of all odd rings are in vertical alignment, the sectors of all even rings are in vertical alignment, but the sectors of the odd rings are rotated relative to those of the even rings by an angle equivalent to that subtended by about half the arcuate extent of one sector. Such rotation of the odd rings relative to the even rings produces between the sectors respective to the odd and even rings an interleaved or lapping relation wherein the two arcuate half-portions of each odd ring sector each lap fully or almost fully with arcuate half-portions of the even sectors contiguous with that odd ring sector.

The lapping of the odd and even ring sectors permits them to be interconnected by axial shear pins passing through registering holes in the lapped portions. Twelve such shear pins 160–171 are shown, all shear pins extending axially through all of the rings 140a–140L. The shear pins 160–171 at their opposite ends carry nuts 172, 173 recessed in countersinks 174, 175 in the end rings 140a, 140L. Inasmuch as those end rings are out of the pressure region (FIG. 2), the formation in them of countersinks does not detract from the strength of the support cylinder. The nuts 172, 173 are moderately tightened on the shear pins to be drawn against the end rings, wherefore the pins serve to axially clamp the rings 140a–140L as well as to provide tension-resistant couplings for their ring sectors. Another function performed by the long shear pins is that they tend to equalize out the radial expansion deflections under pressure of the separate rings so as, thereby, to minimize the described "nicking" effect. Contrary to what might be expected, the radial shearing stress in each long pin does not progressively increase with increase in the number of ring layers subjected to the radially outward face from the pressurized fluid. Instead we have discovered by stress analysis that the radial shearing stress in each pin is limited to that produced by the last ring layer which is loaded and the contiguous ring layer which is unloaded, i.e., is independent of the axial length of the cylinder or the fraction of that length subjected to loading by such radially outward force.

In operation, the sectors 150–155 of, say, odd ring 140c will tend to be forced radially outward by the fluid pressure transmitted to the ring. In order for those ring sectors to be radially displaced, however, the shear pins 160–171 would have to spread apart. Such spreading is prevented (except for a slight amount due to the resilient stretching under tension of the ring sector arcs) because each two shear pins on opposite sides of a radial gap (forming a circumferential discontinuity of ring 140c) are connected above and below that ring by circumferentially continuous portions of one or more even ring sectors. Therefore, the sectors of odd ring 140c are connected together by the shear pins and by the even ring sectors above and below ring 140c to render the ring 140c a closed ring transmissive of hoop tension.

The hoop tension in ring 140c is free of any Lamé stress concentration at the ring's inner wall because that inner wall is not continuous around the ring. In fact, nowhere in ring 140c is there any stress concentration due to Lamé effect.

What has been said about ring 140c is true also of the other rings except that the end rings 140a, 140L are, of course, interconnected on one side only with the other rings. However, these particular rings are not subject to hydraulic forces anyway.

Because there is no appreciable Lamé effect in the rings 140–140L, the ratio of their outer diameter to inner diameter is not determined by the criterion that the value of the ratio must be great enough to reduce to an acceptable level the Lamé stress concentration at the inner wall. Hence, for the discontinuous rings 140a–140L the O.D./I.D. ratio may be substantially less than that required for continuous rings wherein Lamé stress concentration does occur. For example, when the FIG. 2 support cylinder 125 is comprised of discontinuous rings of the sort shown by FIGS. 5 and 6, the O.D. of the rings may be only about 22′ to 24′ as compared to the 28′ O.D. necessary for continuous rings. Such decrease in O.D. results in a substantial decrease in the weight and cost of the support cylinder. Thus, discontinuous rings are advantageous for reasons in addition to the consideration that a cylinder comprised of such rings can be fabricated from components which are individually easy to manufacture, transport and handle.

The shear pins are disposed far enough out from the inner radius of each ring sector to provide around each pin axis an annular sector portion with an outer radius such that the cross section of the portion (in planes through the pin axis) has adequate holding strength for the tension forces produced by the stretching of the sector between the two pins through the sector A sector annular portion adequately large for such tension holding purposes is provided when the outer diameter of the portion equals the diameter of the pin divided by 0.45. Accordingly, it is desirable for the axis of each pin through a ring sector to be radially inwards of the sector O.D. by a distance equal to the pin diameter divided by 0.90. Other stress analysis considerations indicate that the axis of each pin through a sector should have a radial distance from the cylinder axis at least equal to the mean radius of the sector.

For higher fluid pressure values, the O.D. of the cylinder may be moved outward to permit the shear pins to be moved out and thereby have their diameters increased, while, at the same time, maintaining around each pin an annular sector portion with an outer diameter at least equal to the pin diameter divided by 0.45. Thus, for example, a hydraulic pressure of 400,000 p.s.i. may be contained in a hydrostatic extrusion chamber by utilizing a FIG. 5 support cylinder in which each discontinuous ring has an I.D. of 22⅜″ and an O.D. of 79″, there being eight discrete ring sectors per ring, and the 16 shear pins for the cylinder of 4½″ diameter and being spaced around a circle of 66¾″ diameter.

While the FIG. 5 support cylinder is particularly advantageous because its identical ring sectors and identical shear pins make for lower cost and case of manufacture and fabrication of the cylinder, the cylinder is susceptible to a considerable degree of modification. The only basic considerations governing the structure of the cylinder are that its discrete ring sectors fit together to form the complete cylinder, and that the ring sectors are interconnected in a manner which renders the cylinder as a whole transmissive of hoop tension without Lamé effect. Consonant with those considerations, the various rings of the cylinder may be of unequal thickness or be formed of multiple plys of ring sectors. The ring sectors themselves need not be rectangular in arcuate cross section, but may be of some other shape as, say, flattened hexagonal. Instead of connecting the ring sectors of each ring to each other through sectors at other axial levels, the ring sectors of each ring may be more directly connected by providing lappings of the side portions of the sectors, and by passing shear pins through those lappings, the number of pins equaling the number of sectors in the ring. If there are $n$ sectors per ring, a lapping of contiguous sectors in the same ring may be realized by dividing each sector into two axial halves of which one has an arcuate angular width of $360/n+a$ ($a$ being the lapping angle) and the other half has an arcuate angular width of $360/n-a$, the sectors being disposed around the ring so that the lower halves of the sectors alternate between a half of the smaller arcuate width and a half of the larger arcuate width.

It is to be understood that the FIG. 5 cylinder is not shown dimensionally to scale in respect to the dimensions characterizing the support cylinder of the FIG. 2 ram unit, and that the dimensions of the FIG. 5 cylinder may be varied to suit it to different applications.

FIG. 7 shows a modification of the FIG. 5 cylinder wherein each of the long shear pins of FIG. 5 has been divided into a plurality of segments or stub pins. Thus, for example, the long shear pin 160 (FIG. 6) has been divided (FIG. 7) into three stub pins 180, 181, 182 of which each spans a separate four of the twelve rings of the cylinder. A stub pin which spans four rings of equal thickness is of optimum length because that length is the shortest one for which the pin has equal holding areas for the oppositely directed tension forces to which the pin is subjected by the ring sectors it links. In FIG. 7, the rings which constitute the cylinder are axially clamped by a pair of end clamping plates 184, 185 and by equiangularly spaced clamping bolts disposed outside the cylinder to couple together the plates 184, 185.

Some of the avantages in the use of stub pins are that, being smaller than long pins, they weigh less and are easier to transport and handle. The stub pins also facilitate fabrication of the cylinder in that they may be inserted individually at appropriate times as the fabrication proceeds to increase the number of cylinder rings in place.

In connection with FIG. 7, it is to be understood that the stub pins may be of varying length, that the stub pins which replace one long pin need not be in axial registration, and that stub pins at different angular locations around the cylinder may overlap with each other in the axial dimension so as to provide a continuous axial coupling of the component rings of the cylinder through a portion of or all of the axial length of the cylinder.

FIG. 8 is a fragmentary view of a pressure container which has a support cylinder generally similar to that of FIGS. 5 and 6, the cylinder being, however, modified to better adapt it to a high fluid pressure within the container. In FIG. 8, the liner 130 is formed of a soft metal such as lead. Also, the inner wall edges 190 of the ring sectors of the support cylinder are flared to widen at the inner wall the discontinuities 192 between the sectors and to relieve stress concentrations at those edges. The first time a high hydraulic pressure is developed in the container, inserts 191 of the soft material of the liner are forced into the widened inner portions of the sector discontinuities 192. Since the material in those inserts is in a state of compression, after the hydraulic pressure has been relieved the inserts produce an auto-frettage effect in the support cylinder.

FIG. 9 is a fragmentary view of a pressure container which again uses a support cylinder similar to that of FIGS. 5 and 6, but which includes additional components enabling the cylinder to contain a fluid pressure having within the hydraulic chamber a value which would overstress the material of the cylinder if the pressure were to be applied to the inner wall of the cylinder directly from the liner 130. In FIG. 9 a buffer cylinder 200 of ring sectors 201 is interposed between the support cylinder and the liner 130, the sectors being made of hard pressure-resistant material such as tungsten carbide or stellite.

The ring sectors 201 of the buffer cylinder 200 are not coupled with each other. Preferably, the sectors of the buffer cylinder form axially superposed rings of the same thickness as and at the same levels as the rings of the outside support cylinder. The sectors of the buffer cylinder may, however, be of any size shape and disposition so long as they fit together to form a complete buffer cylinder.

The FIG. 9 pressure container operates as follows. The high hydraulic pressure on the interior of the container is transmitted substantially unattenuated through the inner tube 120 and the liner 130 to the sectors 201 of the buffer cylinder 200. Because, however, those sectors are not coupled with each other, the fluid pressure develops in the sectors only a compressive stress, and the hard material of the sectors is well adapted to withstand such stress without failure. Inasmuch as the sectors 201 are of increasing arcuate cross section in the radially outward direction, the sectors 201 act as stress attenuators or "pressure dividers" such that the pressure exerted by each sector on the support cylinder is substantially less than the pressure exerted on the sector's inner wall. Hence, by selecting a suitable value for the O.D./I.D. ratio of the hard sectors 201, the pressure on the inner wall of the support cylinder may be reduced to a value for which the material of the support cylinder is not overstressed.

It is to be understood in connection with FIG. 9 that the edges of sectors 201 at the inner ends of the sector discontinuities may be flared like the edges 191 of FIG. 8. For a further understanding of the operation of stress-attenuating buffer cylinders, reference is made to U.S. Patent 2,554,499 to Poulter.

Figure 10:
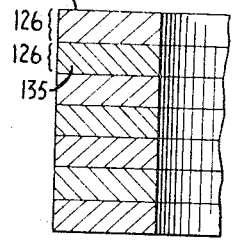
FIG. 10 is a broken-away view in radial cross section of another form of structure suitable for the hydraulic cylinder of the FIG. 1 press.
Figure 11:
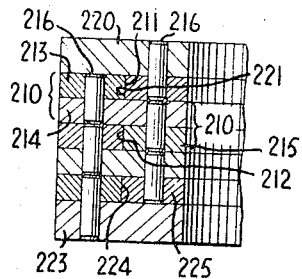
FIG. 11 is a broken-away view in radial cross section of a modified form of a structure having any or all of the features (consistent with each other) which are shown by FIGS. 5, 7, 8, 9 and 10, the view of FIG. 11 showing only one side of the structure.

FIG. 11 illustrates a modification which is applicable to the FIG. 10 cylinder and, also, to the support cylinder of FIGS. 5 and 6 whether or not the latter cylinder has one or more of the modifications discussed in connection with FIGS. 7, 8 and 9.

In accordance with the FIG. 11 modification, the several ring layers of the support cylinder have an axially lapping relation which minimizes the heretofore mentioned "nicking" effect.

More specifically, in the FIG. 11 modification the support cylinder is comprised of a plurality of axially superposed ring layers of which each (except for the two end layers) has on axially opposite sides an inward facing shoulder and in outward facing shoulder. Thus, for example, intermediate ring layer 210 has an inward facing shoulder on its upper side and an outward facing shoulder 212 on its underside. Those shoulders may conveniently be provided by making ring layer 210 a three-ply structure comprised of an upper ply 213, a central ply 214 and a lower ply 215, the side plys 213, 215 being connected to the central ply 214 by a number of plug-fitted shear pegs 216 for each connection. When the cylinder is comprised of discrete ring sections interconnected by shear pins (e.g., FIG. 6, FIG. 7), the pegs 216 are at different radial distances from the cylinder axis than the radial distance from that axis of the shear pins.

The other ring layers intermediate the ends of the FIG. 11 cylinder have the same structure as the layer 210. As a result, the upper outer inward-facing shoulder of each intermediate layer laps with the lower inner outward-facing shoulder of the next lower layer. The upper end layer 220 has only an outward-facing shoulder 221 lapping with the inward-facing shoulder 211 of the layer 210. The lower end layer 223 has only an inward facing shoulder 224 lapping with the outward-facing shoulder of the next higher layer 225.

In operation, as the ram 56 moves downwardly in the pressure container, the line marking the lower limit of the pressure region drop until it reaches, say, the level of layer 210. That layer is then radially expanded by the pressure but, in expanding, the outward facing shoulder 212 of ply 215 engages the inward-facing shoulder of the outer ply of the next lower ring 225 to force that layer also to expand radially, and so on down the line of further intermediate ring layers (not shown). Because however, the ring layer 210 forces the next lower layer 225 to expand radially almost as much as the layer 210 does itself, little if any misregistration is produced between the respective inner wall surfaces of layers 210 and 225 as a result of the pressure loading of layer 210 while layer 225 is still unloaded. Hence, the described axial lapping relation of the ring layers of the support cylinder serves to reduce greatly the "nicking" effect and the additional stresses in the shear pins.

In connection with FIG. 11, it might be noted that the various intermediate ring layers do not have to axially lap throughout the entire circumference of the support cylinder. Instead, each intermediate layer may have angularly spaced, radially outward, upwardly projecting portions received in recesses formed in the circumference of the next higher layer between the upwardly projecting portion of the latter layer, the arc length of all such portions being the same, the arc length of all such recesses being the same, and the recesses being of slightly greater arc length (for clearance purposes) than the protruding portions. Such full axial lapping over part of the cylinder circumference may be realized with the identical discrete ring sectors of the FIG. 5 cylinder by providing each sector at its outer margin and angularly opposite ends with a pair of upstanding lugs each of the same arc length slightly less than 1/4 of the arc length of the sector, and by further providing between these lugs an arcuate recess formed in the circumference of the sector to be long enough and deep enough to receive the adjacent two lugs respective to the two sectors underlying the recess.

Figure 12:
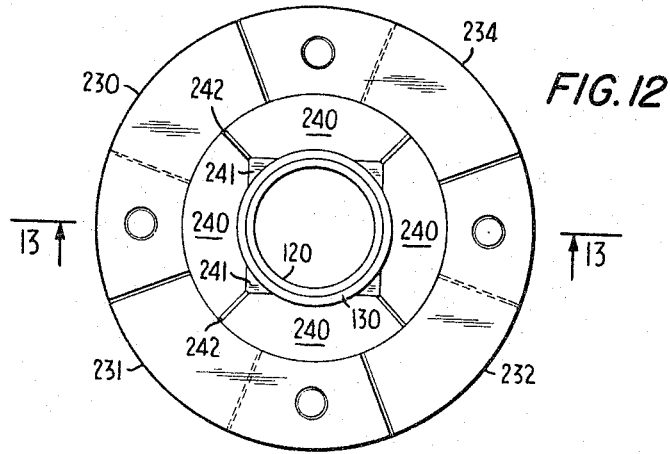
FIG. 12 is a plan view of another form of structure suitable for the FIG. 1 press.
Figure 13:
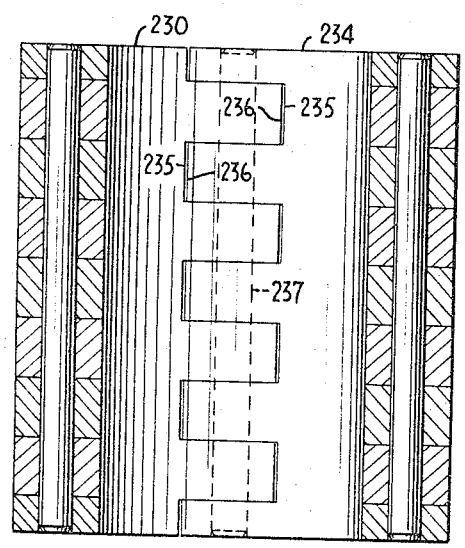
FIG. 13 is an elevation view in radial cross section of the outer shell of the cylinder of FIG. 12.

FIGS. 12 and 13 are drawings of an embodiment of a pressure container wherein the support cylinder is subdivided into sectors 230–234 of which each is axially coextensive with the length of the cylinder. Each of those sectors has on each side a plurality of square notches 235 axially alternating with square teeth 236, those notches and teeth being in meshed relation with the notches and teeth of the sector adjacent at that side. The sectors are connected together by shear pins 237 passing through the zones of interleavings of the teeth of the ring sectors. The FIG. 12 cylinder is transmissive of hoop tension without Lamé effect.

Disposed in the FIG. 12 support cylinder is a buffer cylinder formed of discrete uncoupled hard ring sectors 240 axially coextensive with the support cylinder and generally similar in horizontal shape to those of the FIG. 9 buffer cylinder excepting that only portions of the liner 130 are in arcuate contact with the hard ring sectors 240. The remaining portions of the liner are in arcuate contact with wedge bodies 241 of hard material (e.g., tungsten carbide, stellite) axially coextensive with the support cylinder and inserted into widened inner end openings of the discontinuities 242 between the ring sectors 240. Because those wedge bodies are forced radially outwards by the pressure from the liner, such bodies act as self-tightening seals tending to prevent extrusion of the liner material into the discontinuities 242. In lieu of having the wedge bodies 241 received as shown in FIG. 9, those bodies may be received in wedge-shaped openings (widening towards the cylinder axis) of the radially inward portions of the discontinuities 192 (FIG. 8), such openings having a wedge angle matching that of the wedge bodies.

The FIG. 12 pressure container is well adapted for use in applications wherein the container is small (so that the weight of the ring sectors is no problem) and wherein a high fluid pressure is to be contained. For this purpose, the liner 130 is, as mentioned, preferably made of a soft metal such as lead.

Figure 14:
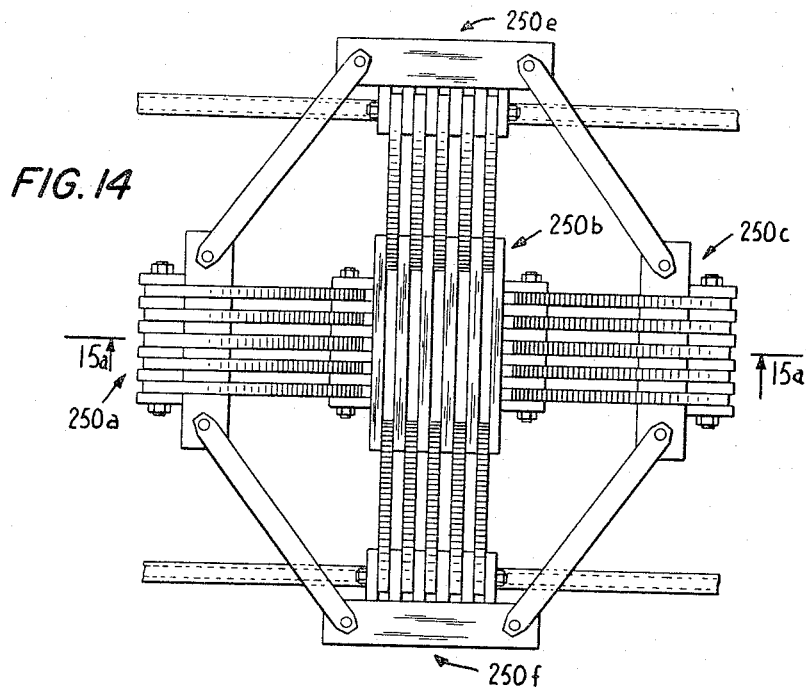
FIG. 14 is a plan view of a multiaxial press in accordance with the invention.
Figure 15A:
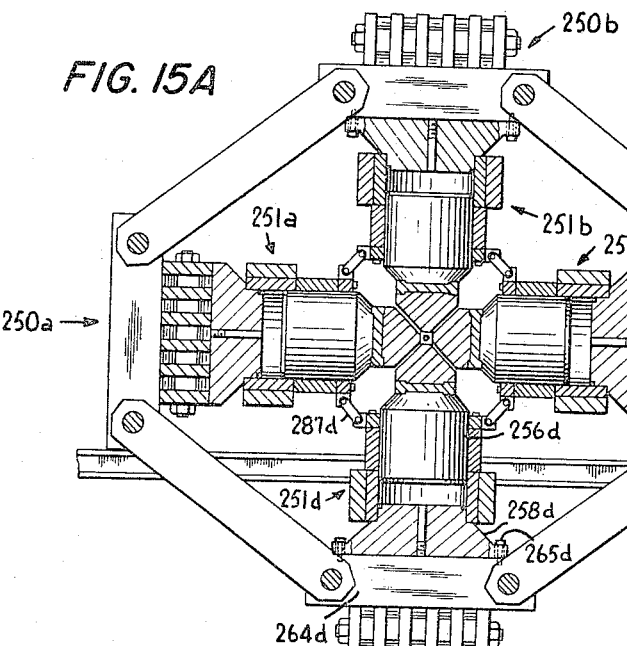
FIG. 15A is a front elevation in cross section of the FIG. 14 press, the view being generally taken as indicated by the arrows 15A—15A in FIG. 14.

FIGS. 14, 15A and 15B are views of a multi-axial cubic press of the type shown in U.S. Patent 2,968,837. The FIG. 14 press has six similar compound heads 250a–250f. Each compound head is composed of two juxtaposed beam plate crossheads in orthogonally criss-cross relation, the two crossheads being of equal longitudinal span (like the component crossheads of the compound heads of the FIG. 1 press). The two crossheads of each head are transversely adjustable in relative position in each of the directions of criss-cross, and the adjustment is facilitated by "Teflon" solid lubricant coatings on the mutually bearing surfaces of the two crossheads of each head.

Each inside crosshead of each compound head is connected by a tie bar coupling to the outside crosshead of each of two adjacent heads, and each outside crosshead of each compound head is connected by a tie bar coupling to the inside crosshead of each of two adjacent heads. As in the case of the FIG. 2 press, the connections between the tie bars of the couplings and the beam plates of the crossheads are pivotal connections formed by the passage of shear pins through interleavings of the sets of tie bars forming the couplings and the arrays of beam plates forming the crossheads. Thus, the frame of the FIG. 14 press consists of three interlinked closed non-rigid articulated rings in orthogonal relation with each other, the three rings being each constituted of a separate group of beam plate crossheads and tie bar couplings. As in the case of the FIG. 1 press, the transverse adjustability in both directions of criss-cross of the two juxtaposed crossheads of each head is a feature permitting each ring to re-align without twisting or otherwise misaligning another ring.

Apart from its multiaxial character and the orthogonal criss-crossing of its juxtaposed crossheads, the FIG. 14 frame is substantially similar in its structural features and, also, in its advantages to the uniaxial pressure-bearing frame of FIGS. 1 and 2.

Each of the six compound heads of the FIG. 14 press provides a load-bearing backing for a respective one of six ram units 251a–251f (251e and 251f not being shown). Since all the ram units are substantially identical, only the unit 251d will be described in detail.

The ram unit 251d comprises a pressure container 255d, a ram 256d received in the front end of the container, a cylindrical guide 257d around the front part of the ram, a passive plug closure received in the rear end of container 255d and radially expandable fluid seal assemblies 259d, 260d (of the sort previously described) by which the clearances between the pressure container 255d and, respectively, ram 256d and plug 258d are rendered fluid-tight.

Plug 258d is coupled to the inside crosshead 264d of head 250d by a plurality of bolts 265d passing through holes 266d in a flange 267d on the plug to enter those beam plates of crosshead 264d which are one in from the outermost beam plates of that crosshead. Coatings of "Teflon" are provided to lubricate the bearing surfaces between the heads of bolts 265d and flange 267d and the bearing surfaces represented by the bottom 268d of the plug and the upper surfaces 269d of the beam plates of crosshead 264d. Moreover, the holes 266d are oversize in relation to the diameter of the bolts 265d. This being so, the plug 258d and the compound head 250d are adjustable in relative position in either transverse direction, wherefore (for reasons earlier explained) no shearing force or bending moment due to that force can be transmitted between the plug 258d and its supporting crosshead through the discontinuity therebetween.

Hydraulic fluid is injected into the space within container 255d by an axial conduit 270d through the plug 258d.

The container 255d is shown as being a compound cylinder formed of an outer tube 275d shrink fitted onto the inner tube 276d. If desired, however, the container may have one of the constructions previously described, i.e., be comprised of a thin-wall inner tube and an outer composite support cylinder.

The container is separated from the guide 256d by a planar discontinuity 280d permitting relatively free adjustment in transverse relative position of the container and the guide. To facilitate such adjustment, the surfaces which bear the discontinuity may be coated with "Teflon." For reasons earlier explained, the coupling of the guide and cylinder through such a discontinuity has the result of isolating the container from any forces tending to misalign the ram and isolating the guide from the fluid pressure loading on the container. The container and the plug 285d are, of course, similarly isolated by the planar discontinuity 281d so that the radial loading and the axial loading of, respectively, the container and the plug are not communicated to the other element.

The guide 257d maintains ram 256d in proper alignment in a manner as follows. Bolted on to the front end of the guide is a square flange plate 285d having an axial bore through which the ram passes. All four sides of 285d are longitudinally notched to form spaced teeth 286d. Interleaved with the teeth on the four sides of the plate are the bottom ends of four sets of tie bars 287d connected to plate 285d by shear pins 288d passing through the mentioned interleavings. The four sets of tie bars are similarly pivotally connected at their upper ends to the flange plates of the four ram units adjacent unit 251d. The guides of all other ram units in adjacent relation are similarly interconnected. Hence, the guides of the six ram units are coupled together by a non-rigid cubic frame which operably is self-truing in alignment in the manner described in U.S. Patent 2,968,837. Since that frame is self-truing, the rams of the six ram units are operably maintained in proper alignment with each other.

Apart from the container 255d (which, as stated, may be modified to be of the composite cylinder type discussed in connection with FIGS. 1–13), the ram units of FIG. 15 are substantially similar in structure, operation and advantages to the FIG. 2 ram unit.

The ram 256d is coupled through a bolster 295d with a tapered pressure multiplying anvil 296d which is one of six anvils disposed around a central cubic cavity, the six anvils being driven inwardly by, respectively, the six ram units. The six anvils are separated by inter-anvil gaps permitting the anvils to move inwardly. Surrounded by the anvils is a pressure receiving assembly disposed in the cavity and comprised of a central object 297d of material to be subjected to high pressure and a cubic casing 298d around that object of a pressure transmitting medium such as pyrophyllite.

In operation, the six rams of the FIG. 14 press are driven inwardly by hyraulic pressure to subject the central assembly to a pressure which is multiplied by the six anvils up to a value of, say, 30 kilobars or greater. Under this exremely high pressure, some of the material of casing 298d extrudes into the inter-anvil gaps to there form a pressure-retaining gasket for the remaining casing material. That remaining material transmits the pressure to the central object 297d to render it compressed by the very high pressure.

Because of the structure of the frame and of the ram units of the FIG. 14 press, the press can be built so that each ram unit is capable of exerting a load of 10,000 tons or greater. Therefore, the press is adapted to compress a central pressure-receiving assembly of much greater size (e.g., one foot on a side) than the assemblies which prior art pressures were able to subject to a pressure of the same value.

The above described embodiment being exemplary only, it is to be understood that additions thereto, omissions therefrom and modifications thereof, can be made without departing from the spirit of the invention and that the invention comprehends embodiments differing in form and/or detail from those specifically disclosed. Thus, for example, the frame aspects of the present invention are applicable to mechanically actuated presses and any other suitable apparatus for which the frame is subjected to heavy loading. Further, the pressure-containing and pressure-stress-relieving aspects of the present invention are applicable to many types of apparatus wherein a pressure is generated such as extrusion apparatus, pressure vessels, "belt" type pressure multiplying apparatus and the like. Accordingly, the invention is not to be considered as limited save as is consonant with the recitals of the following claims.

We claim:

1. Frame means comprising, a plurality of spaced load-opposing compounds heads each comprised of a plurality of crossheads in juxtaposed criss-cross relation, and a plurality of tie couplings of which each is connected to two crossheads disposed at opposite ends of the coupling and belonging to different compound heads, said couplings connecting said compound heads together by ones of the component crossheads of each to form a closed frame comprised of a plurality of closed rings.

2. Frame means as in claim 1 in which the juxtaposed criss-cross crossheads of each compound head are in bearing relation when at least said head is loaded, and in which such crossheads are adjustable in position relative to each other in each of the directions of the criss-cross.

3. Frame means as in claim 2 in which a lubricant is interposed between the bearing surfaces of such criss-crossed crossheads to facilitate the relative adjustment in position thereof.

4. Frame means as in claim 3 in which said lubricant is a coating on such surfaces of a solid synthetic resinous lubricant bonded to such surfaces.

5. Frame means as in claim 1 in which each crosshead of each compound head is of like span and has opposite ends of which each is longitudinally outward of the other crosshead of such head, said compound head thereby being X-shaped.

6. Frame means as in claim 1 in which each crosshead in said frame comprises an array of transversely spaced side-by-side beam plates, and in which each tie coupling in said frame comprises a set of transversely spaced side-by-side tie bars hingedly connected at opposite ends of the set to the crosshead at each such end by a pin passing through an interleaving at that end of the bars of the coupling with the plates of the crosshead.

7. Frame means comprising, a plurality of spaced load-opposing compound heads each comprised of inside and outside crossheads in juxtaposed criss-cross relation, and a plurality of tie couplings of which each is pivotally connected both to an inside crosshead and to an outside crosshead disposed at opposite ends of the coupling and belonging to different compound heads, said couplings connecting said compound heads together by both the inside crosshead and the outside crosshead of each to form a closed frame comprised of a plurality of closed articulated rings which are interlinked with each other.

8. Frame means as in claim 7 in which every tie coupling is characterized by the same spacing between the connections of the coupling with the crossheads at the opposite ends of the coupling.

9. Frame means comprising, a plurality of spaced load-opposing compound heads each comprised of an inside crosshead and an outside crosshead disposed in juxtaposed diagonally criss-cross relation, each of the ends of each crosshead of each compound head being longitudinally outward of the other crosshead of that head to render such compound head of an "X" shape characterized by acute and obtuse angles between the arms of the "X," and a plurality of tie couplings of which each is pivotally connected to two crossheads disposed at opposite ends of the coupling and belonging to different compound heads, said couplings connecting said compound heads together by both the inside crosshead and the outside crosshead of each to form a closed frame comprised of a plurality of closed articulated rings each constituted of a separate group of crossheads and couplings.

10. Frame means comprising, first and second compound crossheads each comprised of inside and outside crossheads in juxtaposed criss-cross relations, first tie couplings of which each has opposite ends pivotally connected to, respectively, the inside crosshead of said first compound head and crosshead of said second compound head, said first tie couplings and the crossheads connected thereto forming a first closed articulated ring, and second tie couplings of which each has opposite ends pivotally connected to, respectively, the outside crosshead of said first compound head and the crosshead of said second compound head, said second tie couplings and the crossheads connected thereto forming a second closed articulated ring.

11. Frame means as in claim 10 in which each of said tie couplings has opposite ends pivotally connected to, respectively, an inside crosshead of one of said compound heads and an outside crosshead of the other of said compound heads, said first and second rings thereby being interlinked.

12. Frame means comprising, a plurality of spaced, polyhedrally disposed compound heads each comprised of inside and outside crossheads in juxtaposed criss-cross relation, and a plurality of tie couplings of which each is pivotally connected to each of two crossheads disposed at opposite ends of the coupling and belonging to adjacent compound heads, said couplings connecting said compound heads together by both the inside and the outside crossheads of each to form a closed polyhedral frame comprised of a plurality of closed articulated rings each constituted of a separate group of crossheads and couplings.

13. Frame means as in claim 12 in which each compound head has its inside crosshead connected by ones of said couplings to ones of adjacent compound heads and its outside crosshead connected by others of said couplings to others of said adjacent compound heads.

14. Frame means as in claim 12 in which each tie coupling connects an inside crosshead of one compound head with an outside crosshead of an adjacent compound head.

15. A multiaxial frame comprising, six compound heads symmetrically disposed about a point and at the intersections of three mutually orthogonal planes through such point, each head being comprised of juxtaposed, orthogonally criss-crossed, inside and outside arrays of transversely spaced parallel side-by-side plates, and the heads in each one of said planes alternating around said point between heads whose inside plates and heads whose outside plates are parallel to that plane, and three separate groups of four couplings of which each group is for a respective one of said three planes, the couplings in the group for each plane being each pivotally connected to two arrays of head plates parallel to that plane and at opposite ends of the coupling and belonging to adjacent heads, one and the other of said two arrays being, respectively, an inside array and an outside array, each coupling being comprised of a set of transversely spaced side-by-side tie bars parallel to the plates coupled thereby and hingedly connected at each end of the set with the array of plates at that end by a pin passing through an interleaving at such end of the tie bars with the plates in that array, the plates and the bars of said frame forming three, closed non-rigid rings which are interlinked with each and are normal to each other.

16. A uniaxial frame comprising, first and second compound heads spaced along an axis, each head being comprised of juxtaposed criss-cross, inside and outside arrays of transversely spaced side-by-side parallel plates, and the inside plates of each head being parallel to the outside plates of the other, a pair of first tie couplings parallel to and on opposite sides of said axis and each pivotally connected at its end towards said first head to a respective one of the longitudinally opposite ends of the outside array of plates of such head, each first tie coupling being also pivotally connected at its end towards said second head to a respective one of the longitudinally opposite ends of the inside array of plates of the second head, and a pair of second tie couplings parallel to and on opposite sides of said axis and each pivotally connected at its ends towards said first head to a respective one of the longitudinally opposite ends of the inside array of plates of said first head, each second tie coupling being also pivotally connected at its end towards said second head to a respective one of the longitudinally opposite ends of the outside array of plates of said second head, each of said couplings being comprised of a set of transversely spaced side-by-side tie bars parallel to the plates connected thereby and hingedly connected at opposite ends of the set with the array of plates at each such end by a pin passing through an interleaving at that end of the bars with the plates of such array, and the plates and bars of said frame forming a pair of closed non-rigid rings which are interlinked with each other.

17. A press structure comprising: a pair of vertically spaced heads, at least one of said heads including at least two crossheads arranged in criss-cross relation to define a horizontal X, four vertical tie couplings connecting said heads together, said tie couplings being horizontally disposed to each be at a respective one of the four arm ends of the horizontal X defined by the crossheads of said at least one head, and horizontal support means for said heads and couplings, said support means passing between said tie couplings and through a vertical line passing through the center of the X.

18. A structure as defined in claim 17 in which said horizontal support means passes through said couplings through the vertical line passing through the center of the X in a direction transverse to that of said first named horizontal support means.

19. In a load-developing apparatus having a frame for load containment including spaced heads joined by a plurality of tie couplings the improvement comprising: at least one of said heads being comprised of a plurality of juxtaposed crossheads in diagonally criss-cross relation, each crosshead terminating in outer end portions and having at least one of said tie couplings joined to each said outer end portion.

20. The improvement as defined in claim 19 wherein each of said crossheads is of like span.

References Cited

UNITED STATES PATENTS

| 545,758 | 9/1895 | Aiken. | |
| 2,707,307 | 5/1955 | Brumbach | 18—16 |
| 2,918,699 | 12/1959 | Hall. | |
| 2,935,116 | 5/1960 | Drebing | 18—16 X |
| 2,968,837 | 1/1961 | Zeitlin et al. | |
| 3,000,295 | 9/1961 | Fenton | 100—214 |

FOREIGN PATENTS

| 560,229 | 3/1944 | Great Britain. |
| 644,980 | 10/1950 | Great Britain. |
| 710,780 | 6/1954 | Great Britain. |

WILLIAM J. STEPHENSON, *Primary Examiner.*